(No Model.)  8 Sheets—Sheet 1.

W. LORENZ.
BAKING OR COOKING OVEN FOR CONTINUOUS WORKING.

No. 314,144.  Patented Mar. 17, 1885.

Witnesses:
W. C. Jindinstan
G. Connolly

Inventor:
Wilhelm Lorenz
by Connolly Bros
his Attorneys (No Model.) 8 Sheets—Sheet 2.
W. LORENZ.
BAKING OR COOKING OVEN FOR CONTINUOUS WORKING.
No. 314,144. Patented Mar. 17, 1885.
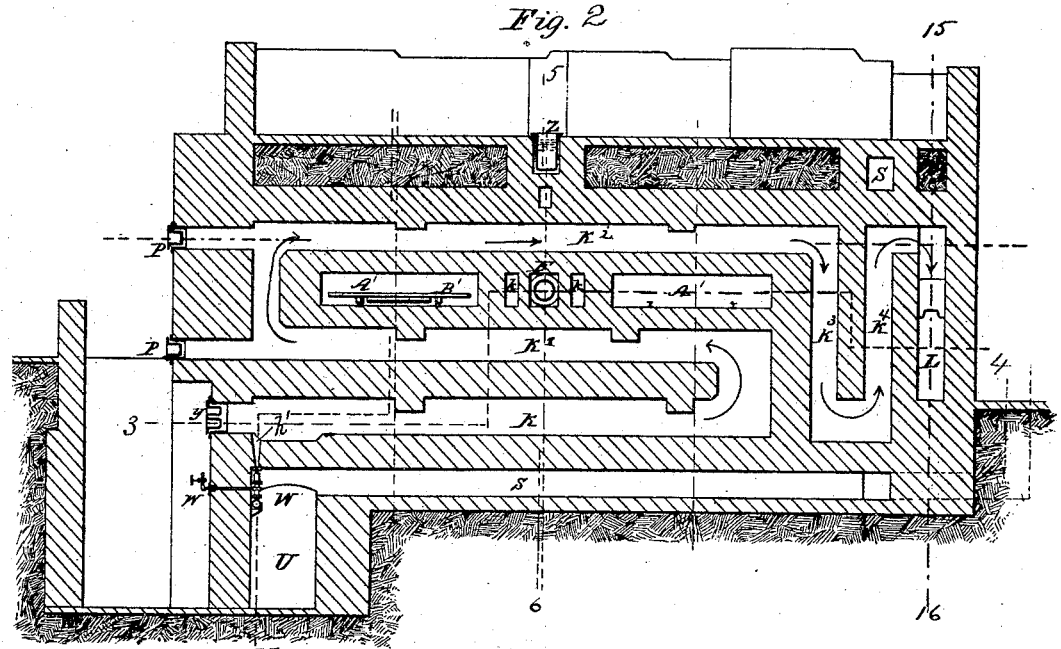
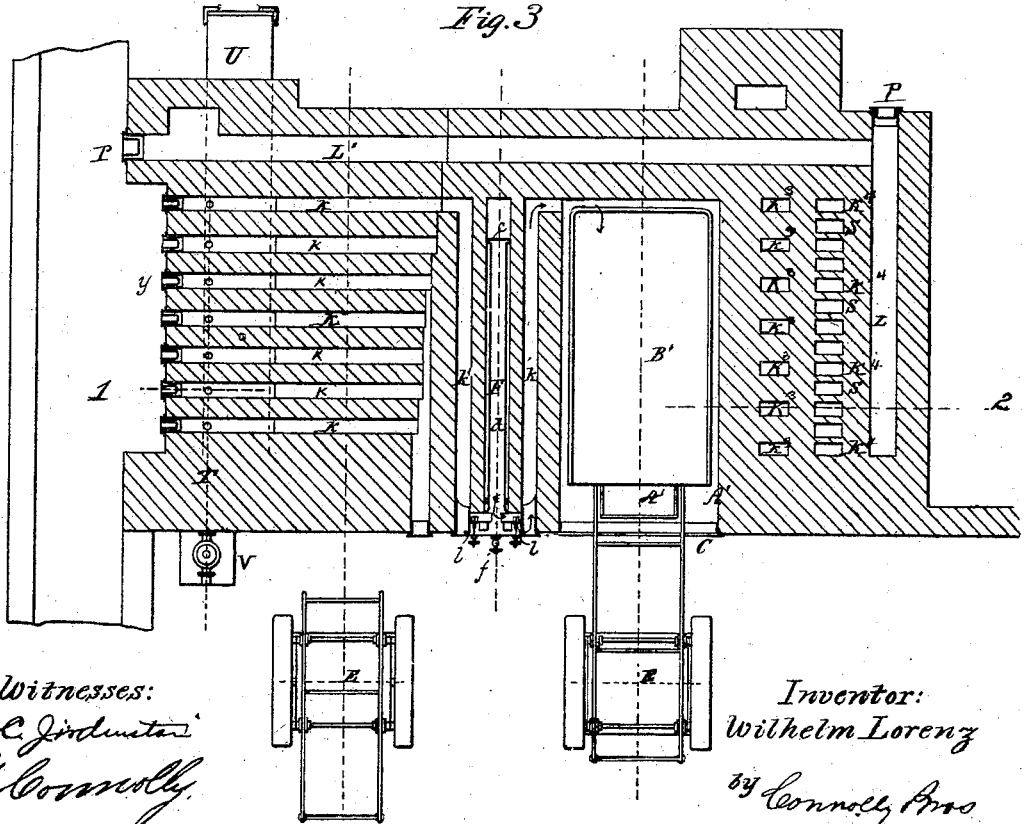
Witnesses:
Inventor:
Wilhelm Lorenz
by Connolly Bros
his Attorneys (No Model.) 8 Sheets—Sheet 3.
W. LORENZ.
BAKING OR COOKING OVEN FOR CONTINUOUS WORKING.
No. 314,144. Patented Mar. 17, 1885.

Witnesses:
G. Connolly
A. Connolly

Inventor:
Wilhelm Lorenz
by
Connolly Bros
his Attorneys

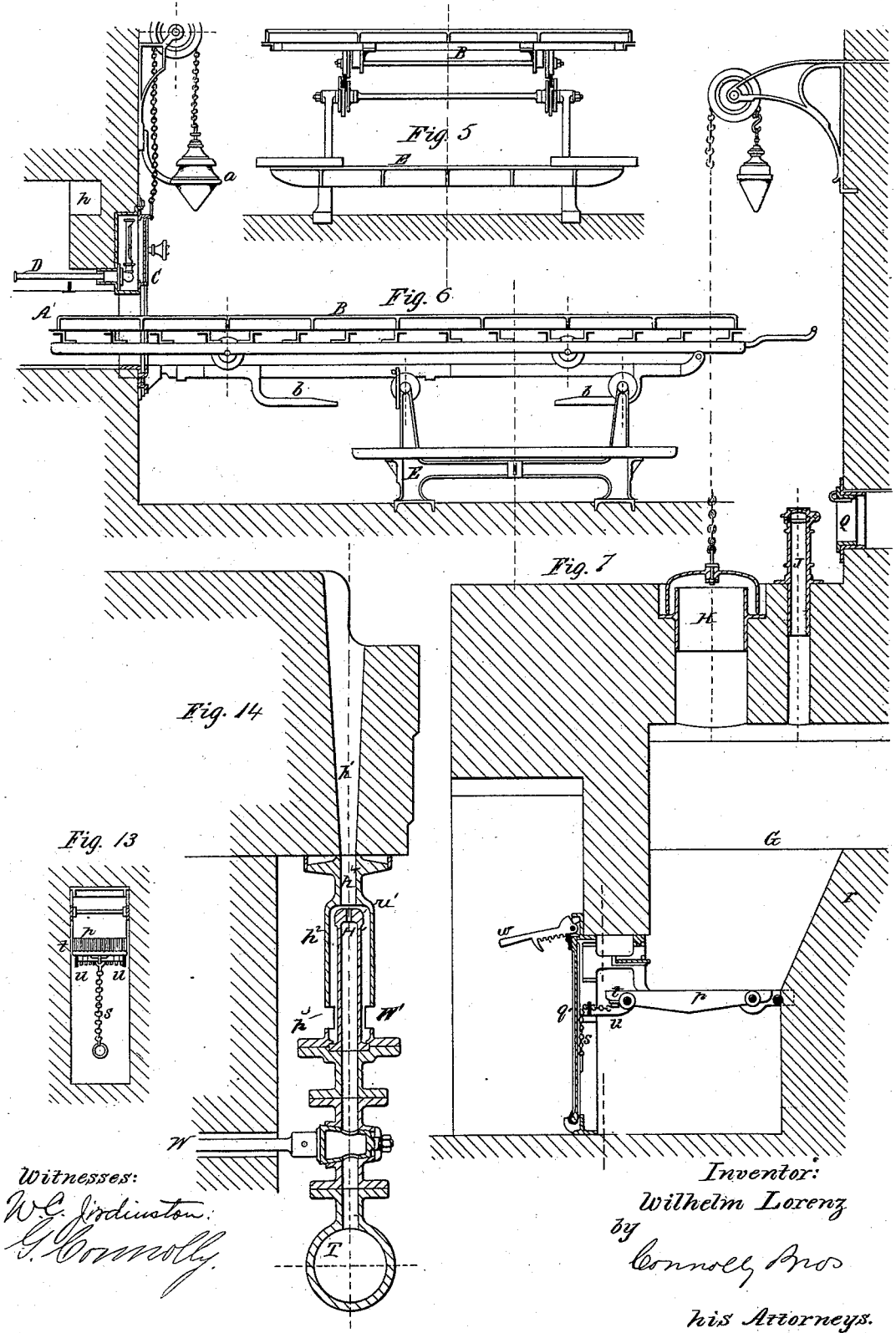

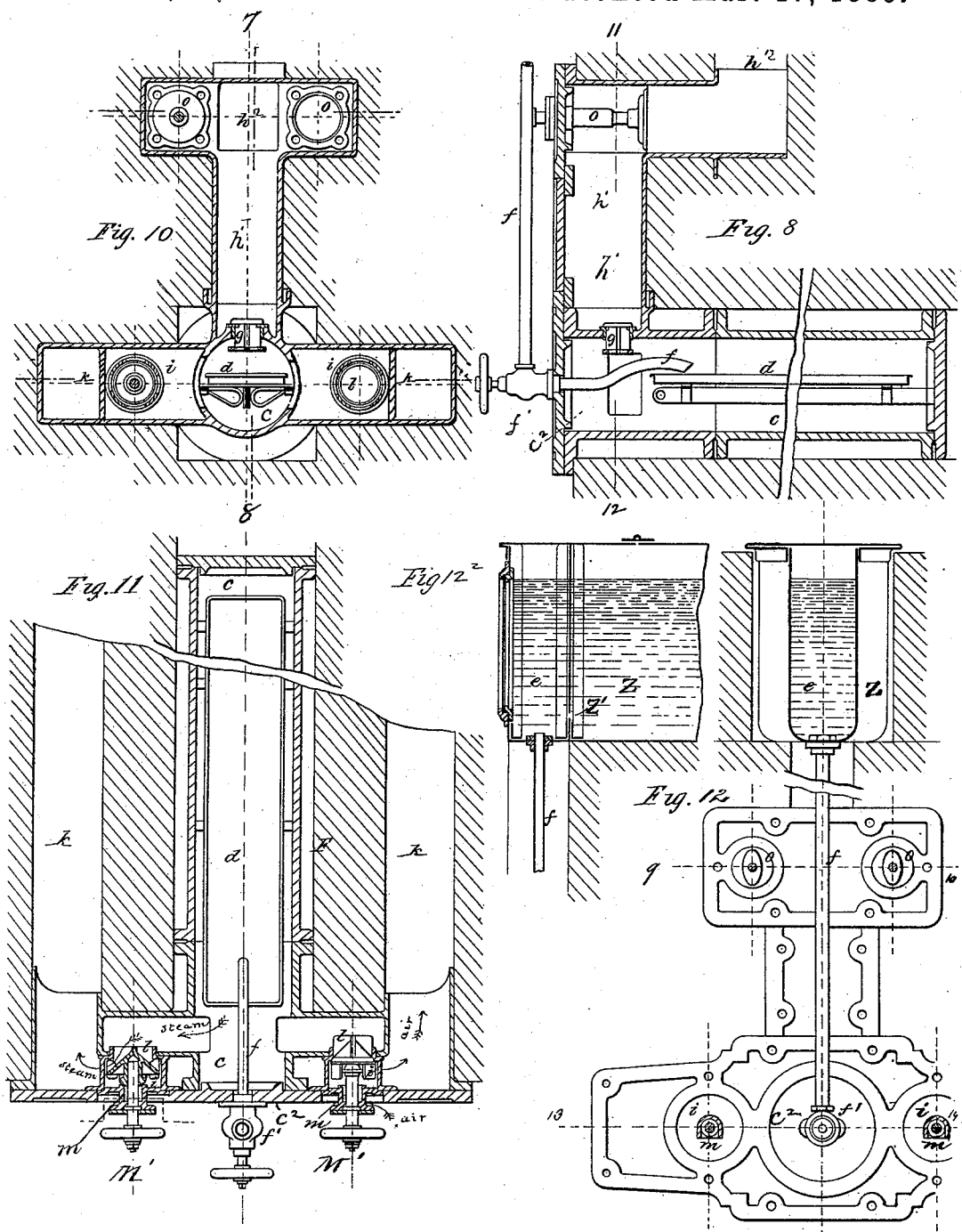

(No Model.) 8 Sheets—Sheet 6.
W. LORENZ.
BAKING OR COOKING OVEN FOR CONTINUOUS WORKING.
No. 314,144. Patented Mar. 17, 1885.

WITNESSES

W. Lorenz
INVENTOR
By Connolly Bros
ATTORNEYS (No Model.)   W. LORENZ.   8 Sheets—Sheet 7.
BAKING OR COOKING OVEN FOR CONTINUOUS WORKING.
No. 314,144.   Patented Mar. 17, 1885.
FIG. 15
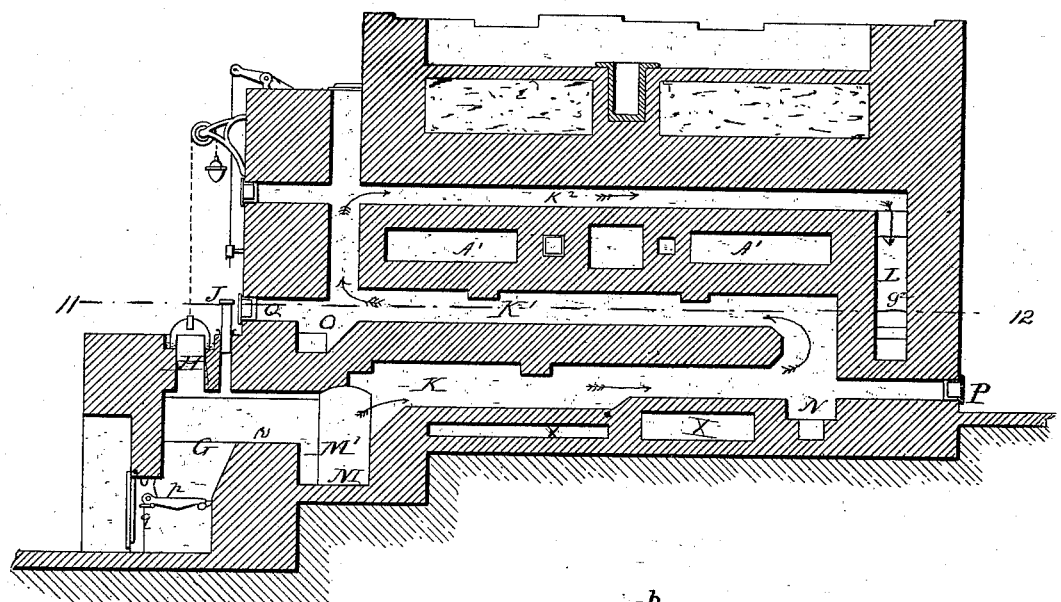
FIG. 15$\frac{b}{a}$
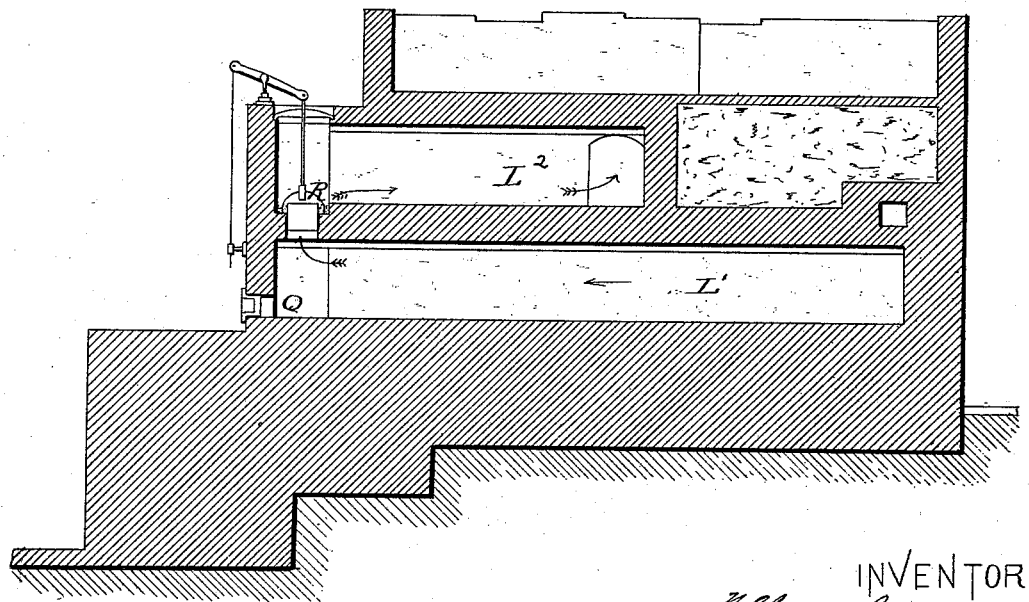
ATTEST.
J. Henry Kaiser
Geo. T. Smallwood
INVENTOR.
Wilhelm Lorenz
by Connolly Bros
atty

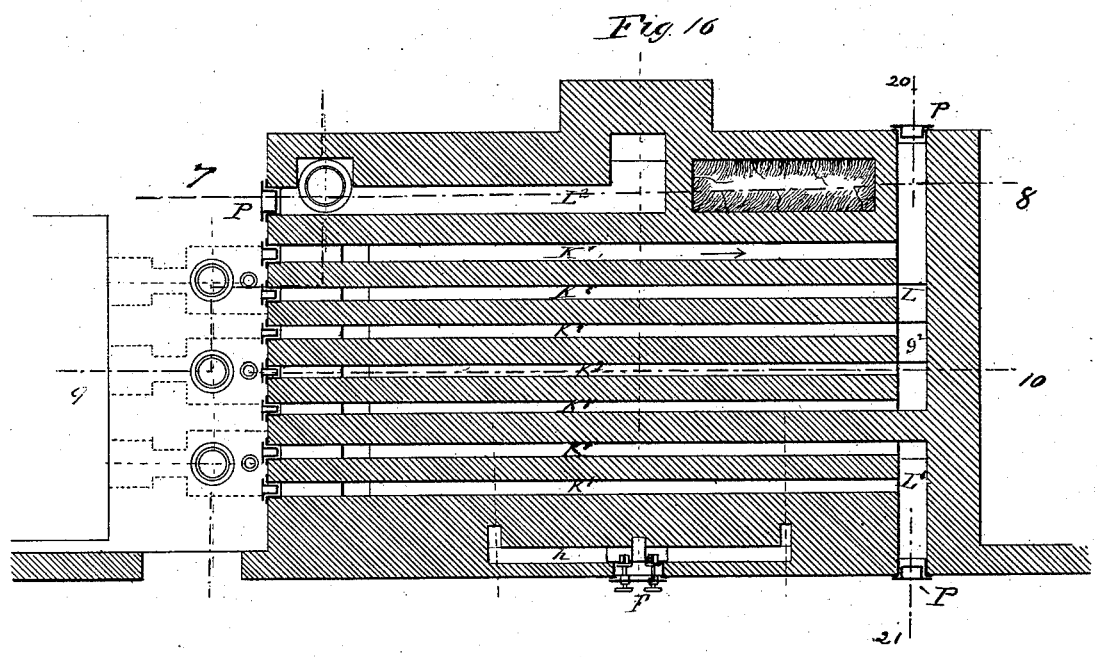

UNITED STATES PATENT OFFICE.

WILHELM LORENZ, OF VIENNA, AUSTRIA-HUNGARY.

BAKING OR COOKING OVEN FOR CONTINUOUS WORKING.

SPECIFICATION forming part of Letters Patent No. 314,144, dated March 17, 1885.

Application filed April 8, 1882. (No model.) Patented in Austria-Hungary July 9, 1881, No. 31 and No. 876, and July 31, 1882, No. 32 and No. 1,375; in Germany January 26, 1882, No. 19,488; in France January 26, 1882, No. 147,067; in Belgium February 13, 1882, No. 57,074; in England February 14, 1882, No. 720, and in Italy March 31, 1882.

*To all whom it may concern:*

Be it known that I, WILHELM LORENZ, a subject of the Emperor of Germany, and a resident of the city of Vienna, in the Empire of Austria-Hungary, have invented certain Improved Baking or Cooking Ovens for Continuous Working, of which the following is a specification.

Figure 1:
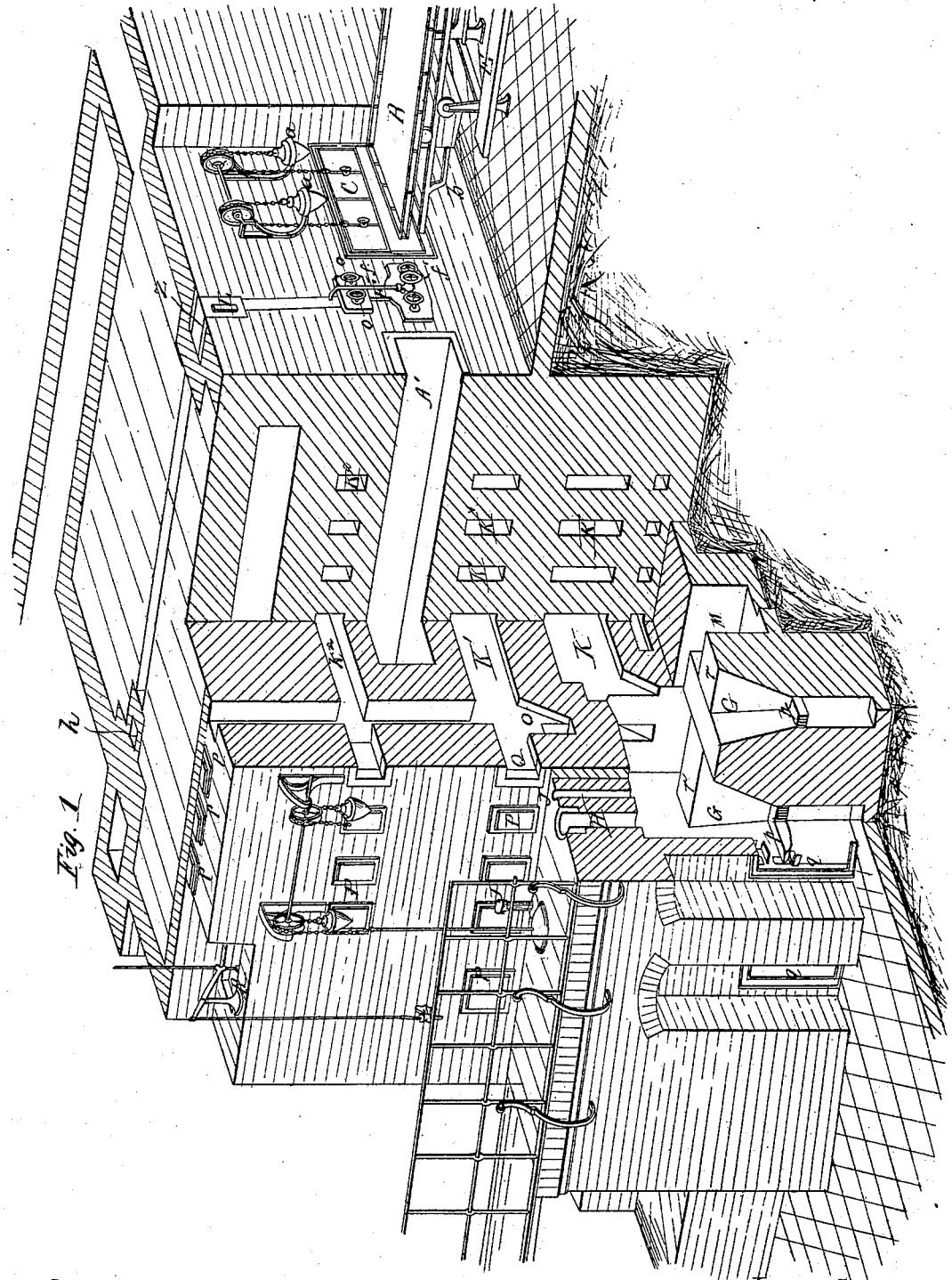
Figure 4:
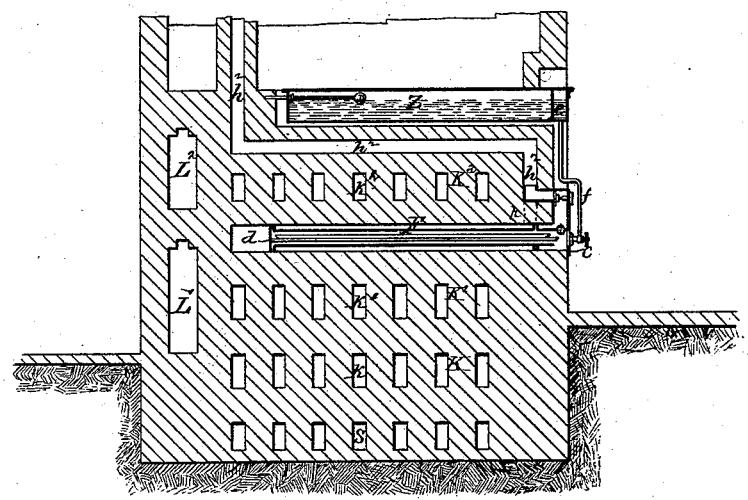
Figure 17:
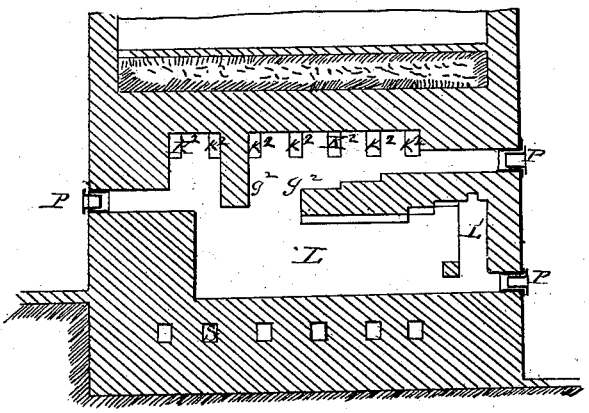
Figure 9:
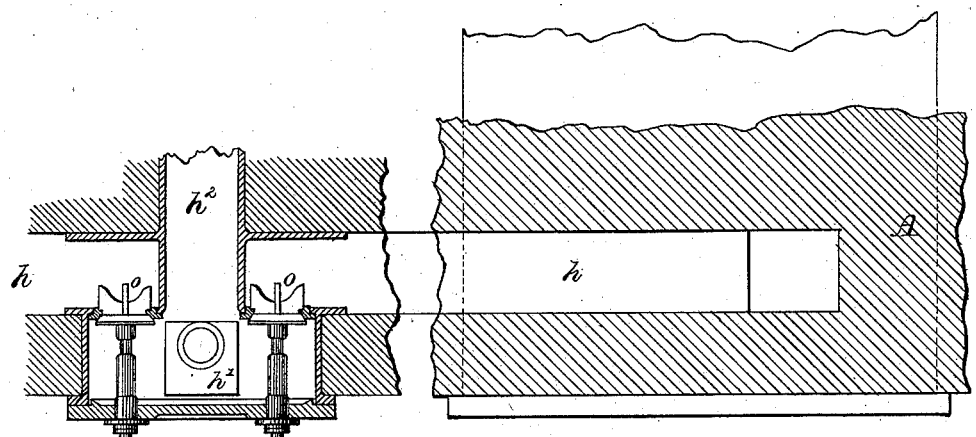

With reference to the accompanying drawings, which show a construction of oven especially adapted for baking bread, Figure 1 is a perspective view of an oven embodying my improvements, a portion being illustrated in section or as broken away to show interior arrangement of flues, said oven being adapted to the burning of solid fuel. Fig. 2 is a longitudinal section of the oven for heating by means of gaseous fuel on the line 1 2 in Fig. 3. Fig. 3 is a ground plan or horizontal section of the same on line 3 4 in Fig. 2. Fig. 4 is a transverse section of the same on the line 5 6 in Fig. 2 through the steam-generating apparatus. Fig. 5 is an end view, and Fig. 6 a side elevation, of the framing for the reception of the tray in front of the oven. Fig. 7 is a longitudinal section through the grate of oven shown in Fig. 1. Fig. 8 is a sectional view of steam-generator on line 7 8 of Fig. 10. Fig. 9 is a sectional view of a portion of the furnace on line with the valves $o$ $o$, showing the flues which lead from the steam-chamber to the baking-muffles. Fig. 10 is a sectional view on line 11 12 of Fig. 8. Fig. 11 is a sectional view on line 13 14 of Fig. 12. Fig. 12 is a front elevation, partly in section, of the steam-generating apparatus. Fig. 12$^a$ is a central longitudinal section of the water-reservoir. Fig. 13 is a sectional detail of the grate for solid fuel. Fig. 14 is a longitudinal section through the gas-burner employed for heating the oven by means of gaseous fuel. Fig. 15 is a vertical longitudinal section of the oven adapted for solid fuel on the lines 9 10 in Fig. 16. Fig. 15$^b$ is a vertical longitudinal section on lines 7 8 of Fig. 16; and Fig. 16 is a horizontal section of the same on the line 11 12 in Fig. 15. Fig. 17 is a vertical transverse section on lines 15 and 16 of Fig. 2.

This invention has relation to certain improvements in baking or cooking ovens adapted for continuous working; and it consists in the novel construction and combination of parts, as hereinafter described, having special reference to, first, providing a construction of ovens wherein a very equable and constant temperature of about 500° Fahrenheit may be maintained by the employment of a large mass of brick-work, which, in taking up the heat from longitudinal and transverse heating-flues formed therein, serves as a magazine for a considerable quantity of heat, which is only slightly affected by variations in the amount of heat supplied thereto or absorbed therefrom during the operation of baking or cooking; secondly, to providing means whereby the baking or cooking operation may be effected in the presence of steam produced in a steam-generating apparatus of special construction.

Referring to the accompanying drawings, in which are illustrated the best means of carrying out my invention, $c$ designates a tubular chamber constituting part of the steam-generating apparatus F, and situated between two baking-chambers or muffles, A A', and communicating therewith by flues or passages $k$ $k$, Fig. 3. Said chamber $c$ contains a shallow tray, $d$, that is supplied with a regulated quantity of water from a reservoir, Z, on the top of the oven, such reservoir being made for this purpose to communicate through a very small orifice, Z', with a receptacle, $e$, located in front of the reservoir and of a capacity equal to that of the tray, and communicating with the latter by a pipe, $f$, having a cock, $f'$, so that no more water will be supplied at one time to the tray than it can contain. The orifice Z', is very minute, and hence, while of sufficient capacity to supply the auxiliary tank $e$ from the main tank Z between the periods of emptying the latter does not admit enough to the auxiliary tank while the contents of the latter are being drawn off through the pipe $f$ in supplying the pan $d$ to overflow. In the front end of the tubular chamber $c$ is situated a safety-valve, $g$, leading into an escape-flue, $h^2$, through a passage, $h'$, through which any excess of steam-pressure in the chamber can escape into the open air. Referring now to Fig. 11 of the drawings, the head $C^2$ has two side passages, $i$ $i$, communicating respectively with the two baking-muffles A by passages $k$, which passages are closed by double valves M', so arranged that in one position they open the communication $k$ between the steam-chamber and the muffle and close a passage, $m$, leading from the latter to the open air, the valves on the left-hand side of the figure being arranged in such a position that the steam has a free passage from the pan $d$ out through the top $l$ of the valve and the openings $i$ of the valve-chamber into the passage $k$, while in the other position they effect a communication from the outer air through passages $m$ and ports $i$ to passages $k$, as shown on the right-hand side of the figure, admitting the air from the outside around the valve-stem and into the muffles through passages $k$, and shutting off the supply of steam to the latter. By this arrangement the baking-muffles A' can either be charged with steam to the required extent or this steam can be made to escape into the open air from the steam-chamber direct by way of valve $g$ into passage $h'$, and thence to $h^2$, or from the muffles through passages $h$ communicating with said muffles and with outlet $h^2$, and controlled by regulating-valves $o$ $o$.

In operating with this apparatus, the communication between the baking-muffles A' and the steam-chamber $c$ must be opened before the water is admitted to the pan $d$ of the latter, the supply-pipe to this being provided with a shut-off cock or valve, $f'$, to control the flow of the water. The valve $o$, leading from the muffle to the escape-passage $h^2$, is also opened for a short time, so as to allow of the escape of the air from the baking-muffles. When the muffle has been supplied with steam for a sufficient length of time, the water-supply to the generator is cut off, the valve M' of the steam-supply passage $k$ is closed, and the passages for the escape of the steam from and for the admission of air to the muffle are opened. By this means it will be seen that the supply of steam to the baking-muffles is under perfect control.

For enabling the baking or cooking operation to be readily controlled, and in order that the articles to be baked or cooked may be easily and rapidly introduced into or removed from the muffles A' A' without requiring skilled labor, the muffles are provided with a traveling bottom or tray, B, on which the articles are placed, and which runs with wheels upon rails laid on the bed of the muffle. At the mouth of the latter are corresponding external rails framed together and mounted on rollers on a framing, E, so that when it is desired to gain access to the mouth of the muffle the rails can be run back somewhat away from the mouth of the oven, and when the traveling bottom B requires to be introduced into or removed from the muffle the rails are run up against the mouth of the latter, the rails being held securely in either position by bent arms $b$ thereon that hook underneath the framing.

For enabling the temperature of the baking muffles to be constantly watched, the mouths thereof (the doors of which are made to slide up and down in guides) are provided with thermometers D, having a vertical external limb and a horizontal limb extending through the door-framing into the muffle, so as to be subject to the heat thereof, Fig. 6.

For enabling the action of the heating-furnace to be maintained with regularity independently of the fireman, and for distributing the flames and hot gases uniformly throughout the heating-flues, the heating apparatus, when solid fuel is used, is arranged as follows: A vertical shaft or chamber, G, Figs. 1, 7, and 15, is provided at bottom with a grate, $p$, and at top with a charging-opening, H, closed hermetically by a hood with sand luting, and also with eye-holes J for observing the combustion. The ash-pit below the grate and an opening in the front wall above the latter are closed by a plate, $q$, Fig. 7, hinged at bottom and capable of being opened to a regulated extent at top, by means of a hinged rack, $w$, engaging a flange on the top of the plate $q$, so as to admit the required quantity of air for effecting the combustion. The fire-bridge $r$ is made of some depth, so as to contain a comparatively large body of fuel above the grate, for which purpose slack or small coal is used, this being charged in large quantities at a time through the top charging-opening H. The fuel is lighted at the top, and is allowed to burn gradually downward until the charge is consumed, when the dust and clinkers are removed and a fresh charge is introduced and lighted.

For facilitating the removal of the dust and clinkers, the ash-pit door is taken away and a transverse bearer, $u$, Fig. 7, which supports the front ends of the furnace-bars $p$, is drawn from under these by means of a chain, $s$, whereupon the grate-bars turn down upon hinges at the back end, so that they can be readily cleared of all clinkers. A transverse flue or passage, M, connects the flues K at or near their forward ends immediately back of the fire-space, and is closed at its ends by doors M', which are provided to admit of access to the passage for cleaning purposes. Each grate or fire-place is provided with or communicates with a series of flues, K, K', $K^2$, and C, leading at the terminal of the series into the flues L and C. The flames and hot gases after passing over the fire-bridge $r$ issue into a series of flues, K K' $K^2$, running transversely to the baking-muffles, and pass thence into and through a series of small flues, L L' $L^2$, formed in the brick-work surrounding the muffles A A, and which communicate with the chimney.

By causing the furnace-gases to issue first into the wide flue K, the greater part of the dust carried with them is deposited therein and is not carried into the small flue L. The flue L, as also the flues K K' K², are extended through the brick-work at one end, where they are closed by doors or stoppers P, so that on removing these from time to time the collected dust can be readily cleared out. Dust-collecting chambers or pockets N O, Fig. 15, are also provided at intermediate points in the length of the flues. The flues K K' K² are made to gradually diminish in sectional area from the furnace end to their junction with the flues L L' L², and they traverse the brick-work in zig-zag direction, so as to offer very extended surfaces for taking up the heat from the gases and imparting it to the brick-work.

In order to insure that there shall be an equal draft through all the flues, notwithstanding their different distances from the furnaces, (of which there are by preference two provided,) the chamber L into which they issue before escaping into the chimney is provided with suitably-shaped baffle-walls, $g^2$, so as to restrict the entrance of the gases from some of the flues more than from others by diminishing the size of the chambers into which they open. The said chamber is also provided with stoppered openings for clearing out the deposit, and the flue L² has a hood-shaped valve, R, Fig. 1, closed with sand luting, by means of which the flues and furnace can be cut off from the communication with the chimney, this being effected when the flues and chamber require clearing, or for other purposes. Closed air-spaces X X, Fig. 15, are formed in the external parts of the brick-work to prevent loss of heat by radiation. A passage or flue, M, Figs. 1 and 15, extends across the oven at right angle to the flues K K, and immediately behind the fire-bridge $r$, which communicates with the flues K K and the furnaces G G, so as to permit of an even radiation of the heat from all the furnaces to have passage through the flues K K, or, in other words, to allow the different furnaces G G to have free communication with all the flues K K. There is also a passage, $h$, leading from or near the top of the ovens at their forward ends to the open air, as shown. This passage is controlled by the valves $o o$, which are opened when it is desired to allow steam or hot air to escape from the oven.

For heating by means of gaseous fuel, the arrangement of the flues is the same as above described, with the exception that no dust-collecting flues or pockets are required, and that air-supply flues S are provided, through which the air required for combustion with the gas is made to pass, so as to become heated to a certain degree. Figs. 2, 3, 4, and 14 show this arrangement. The combustible gas employed for this purpose is by preference water-gas, which is led in a cold condition from a gas-holder through a pipe, W, Fig. 14, to the burners W', situated together with the gas-pipe in a large air flue or chamber, U, Fig. 2.

The burners W', Figs. 14 and 2, consist of nozzles formed as branches on the supply-pipe, the upper end of the nozzle being covered with a hood, $h^2$, having openings $h^3$ for the inlet of air at the bottom, while at top a narrow annular space, $u'$, is formed between the top of the gas-nozzle H' and the hood, so as to allow of only the correct proportion of air combining with the gas. The hood has a neck-like tubular extension, $h^4$, abutting against a tapering passage, $h'$, formed through the brick-work into one of the before-described flues, into which consequently the mixture of air and gas issues, and where it is ignited, there being one such burner provided to each of the said flues. The main gas-supply pipe, as also the separate burners, are provided with cocks or valves for regulating the gas-supply.

The heating apparatus, whether for solid or gaseous fuel, is quite separate from the locality where the baking operation is carried on, and is operated by separate attendants, so that no interruption of the baking or cooking operation is caused thereby.

I claim—

1. In a baker's oven, the combination, with the baking-muffles, of the steam-generating apparatus comprising the chamber $c$, the tray $d$, and means for the admission of steam to the muffles and for controlling the supply thereof, substantially as set forth.

2. In a baker's oven, the combination, with the baking-muffles, the chamber $c$, and tray $d$, of the reservoir Z and pipe-connection $f$, substantially as described, and for the purpose set forth.

In testimony whereof I have signed my name to this specification in the presence of two subscribing witnesses.

WILHELM LORENZ.

Witnesses:
C. O. PAGET,
E. G. S. MOELLER.